(No Model.) 6 Sheets—Sheet 1

N. L. RABER.
AMALGAMATOR.

No. 400,114. Patented Mar. 26, 1889.

WITNESSES:
Fred G. Dieterich
P. B. Turpin.

INVENTOR,
N. L. Raber
BY Munn & Co
ATTORNEYS.

(No Model.) 6 Sheets—Sheet 2.
N. L. RABER.
AMALGAMATOR.
No. 400,114. Patented Mar. 26, 1889.
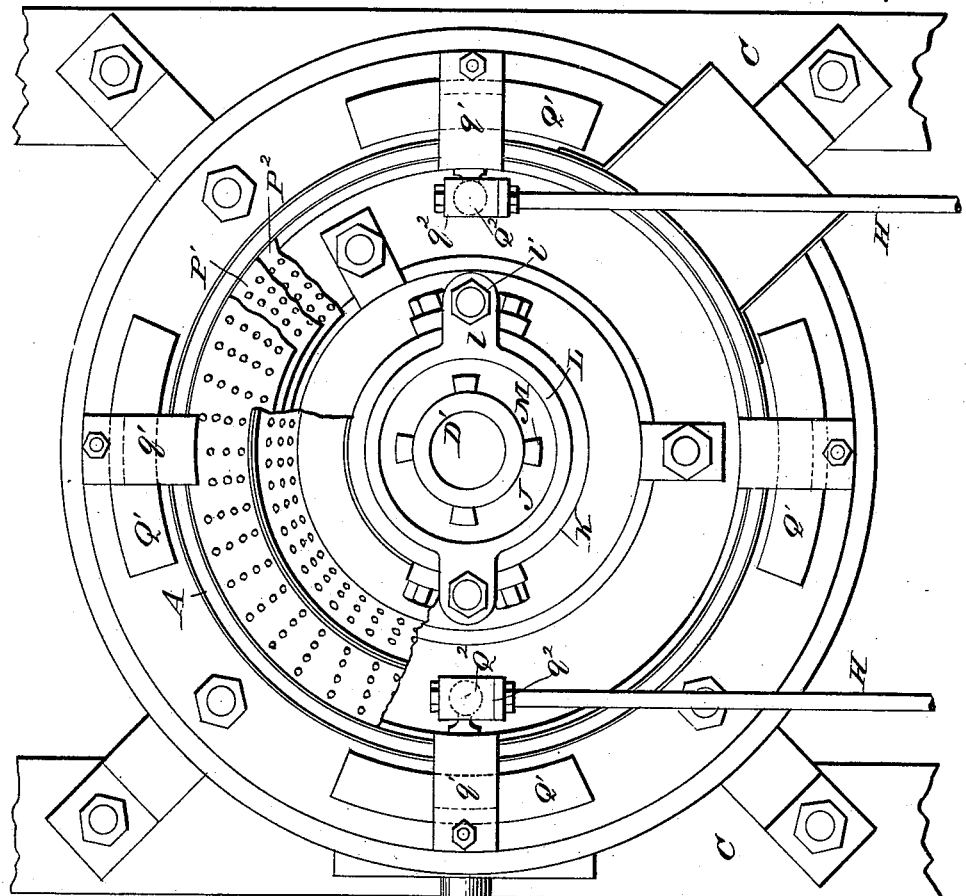
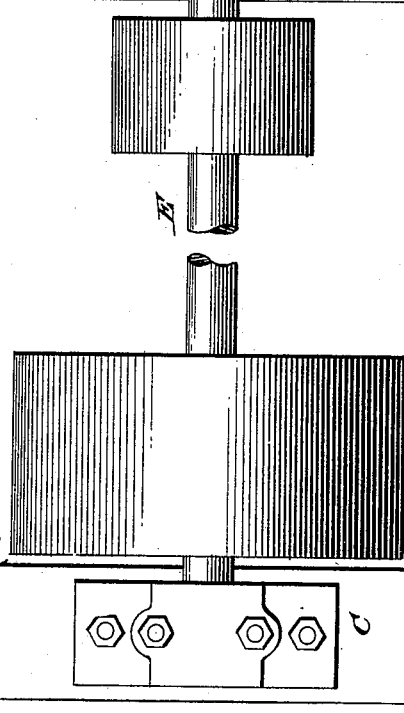
Fig. 2.
WITNESSES:
Fred G. Dieterich
P. B. Turpin
INVENTOR
N. L. Raber
BY
Munn
ATTORNEY (No Model.) 6 Sheets—Sheet 3.
N. L. RABER.
AMALGAMATOR.
No. 400,114. Patented Mar. 26, 1889.
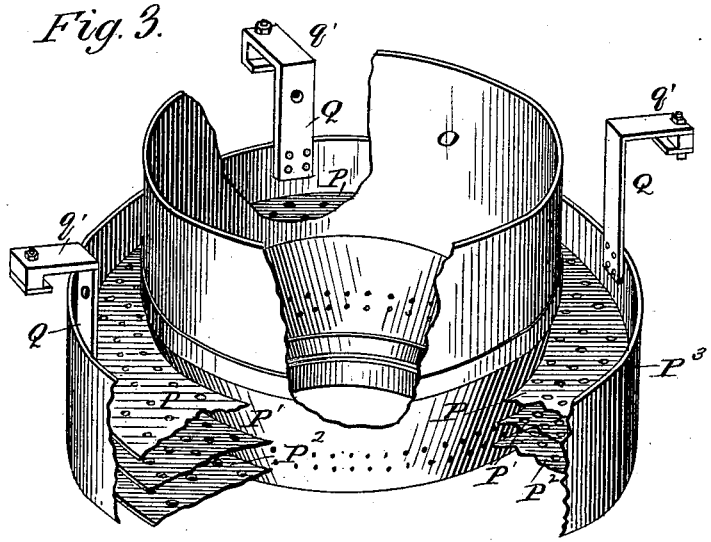
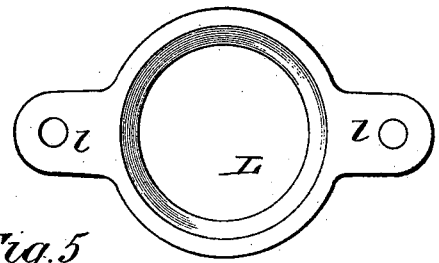
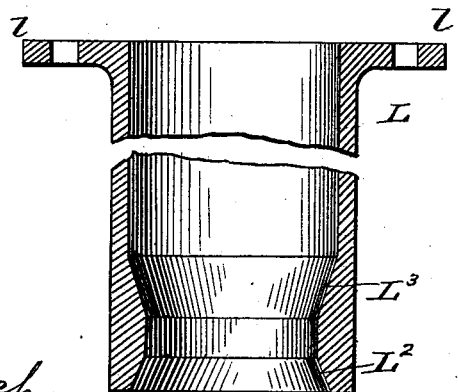
WITNESSES:
Fred G. Dieterich
P. B. Turpin.
INVENTOR
N. L. Raber
BY Munn
ATTORNEYS

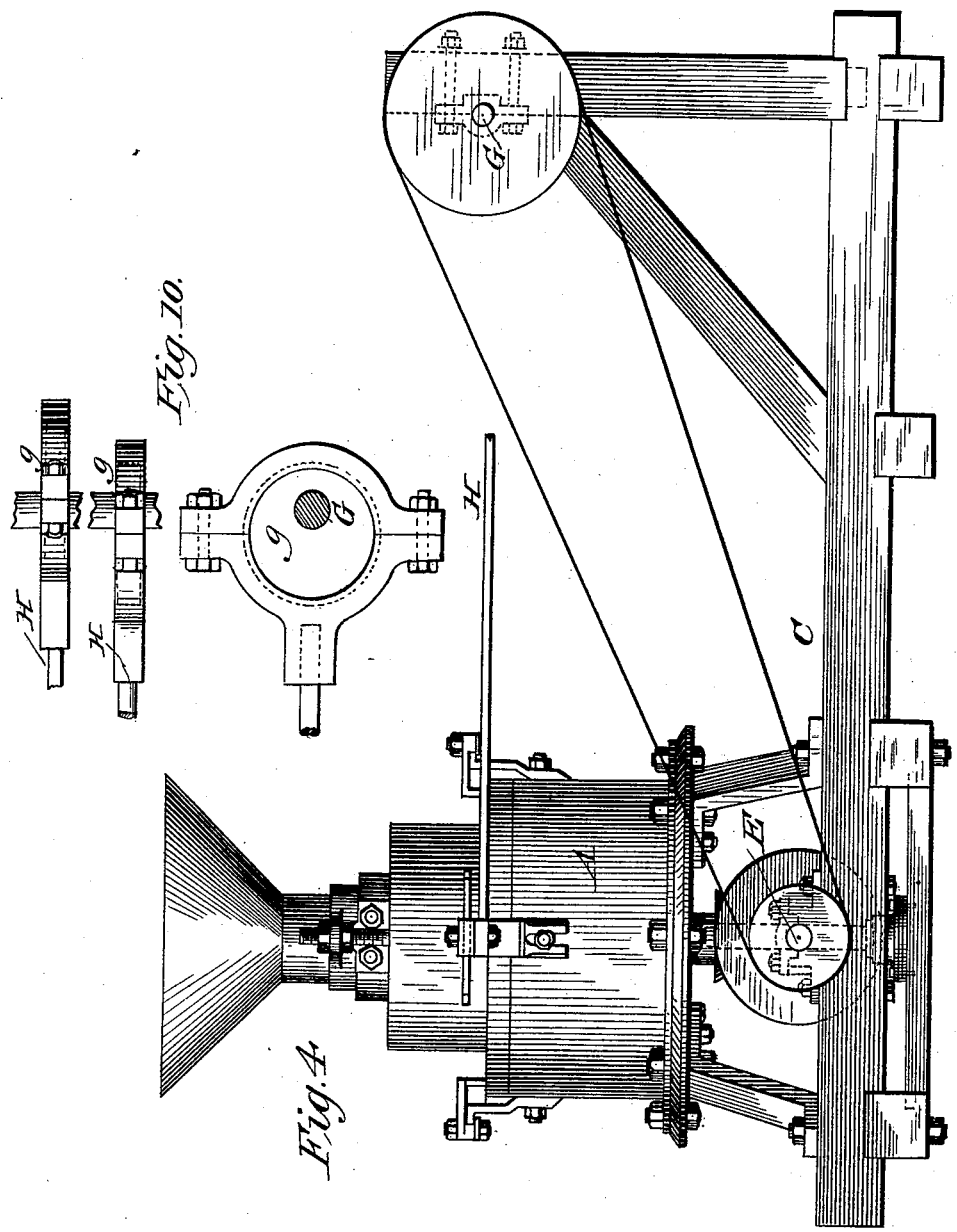

(No Model.) 6 Sheets—Sheet 5.
N. L. RABER.
AMALGAMATOR.

No. 400,114. Patented Mar. 26, 1889.

WITNESSES:
Fred G. Dieterich
P. B. Turpin

INVENTOR.
N. L. Raber
BY Munn & Co
ATTORNEYS

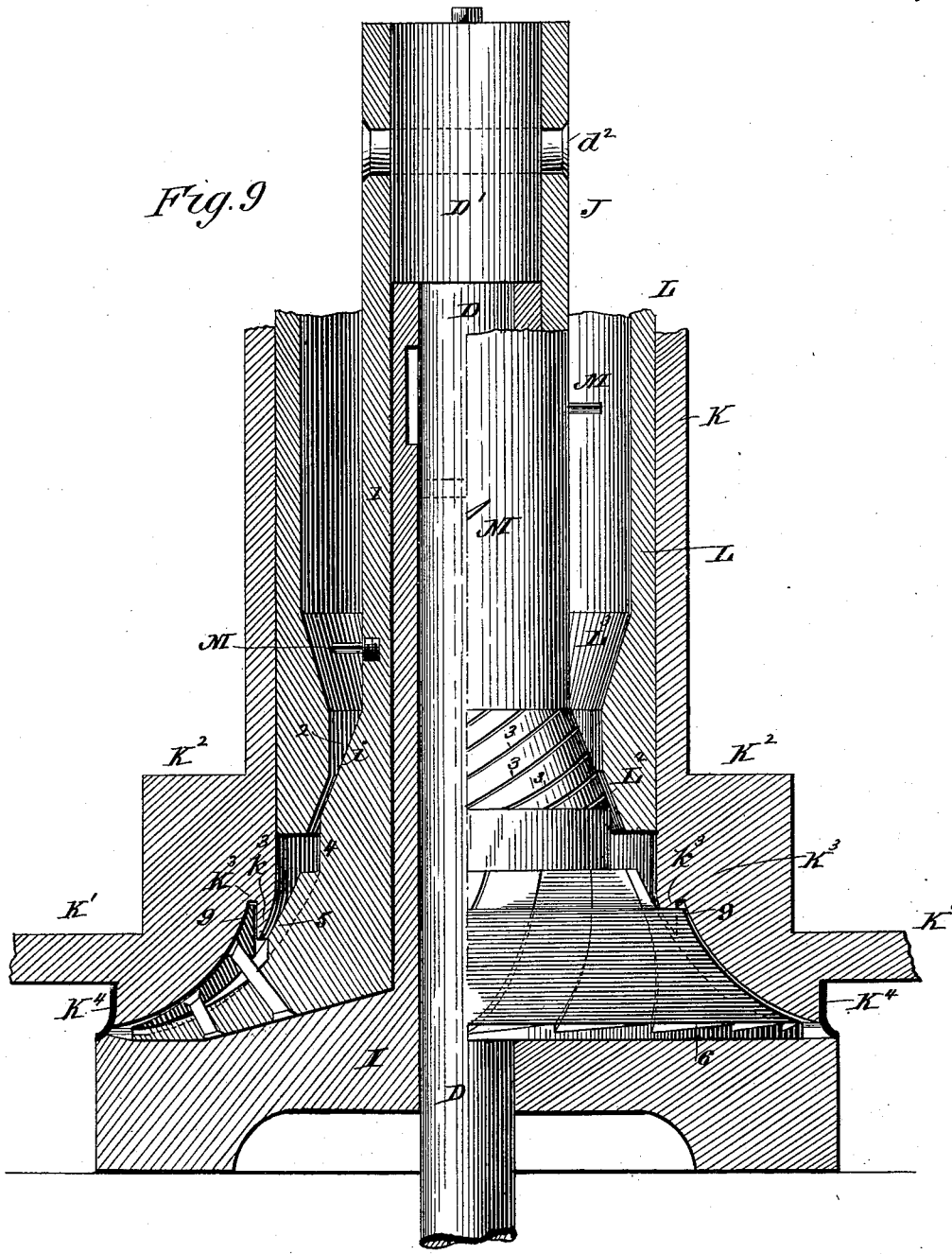

UNITED STATES PATENT OFFICE.

NATHAN LEROY RABER, OF CORVALLIS, OREGON.

AMALGAMATOR.

SPECIFICATION forming part of Letters Patent No. 400,114, dated March 26, 1889.

Application filed May 9, 1888. Serial No. 273,370. (No model.)

*To all whom it may concern:*

Be it known that I, NATHAN LEROY RABER, of Corvallis, in the county of Benton and State of Oregon, have invented a new and useful Improvement in Amalgamators, of which the following is a specification.

This invention is an improvement in amalgamators, and particularly in that class of such machines employing mercury.

The invention seeks to provide a simple construction whereby to thoroughly disintegrate the sand, pulp, &c., and fling them thus disintegrated particle by particle into the body of an undisturbed mass of mercury, thereby obtaining the most intimate contact of the precious metals and the mercury and their consequent certain amalgamation.

The invention also seeks to provide a convenient construction and arrangement of the separator and of the means for oscillating the same.

The invention has for further objects other improvements; and it consists in certain novel constructions and combinations of parts, as will be hereinafter described and claimed.

Figure 1:
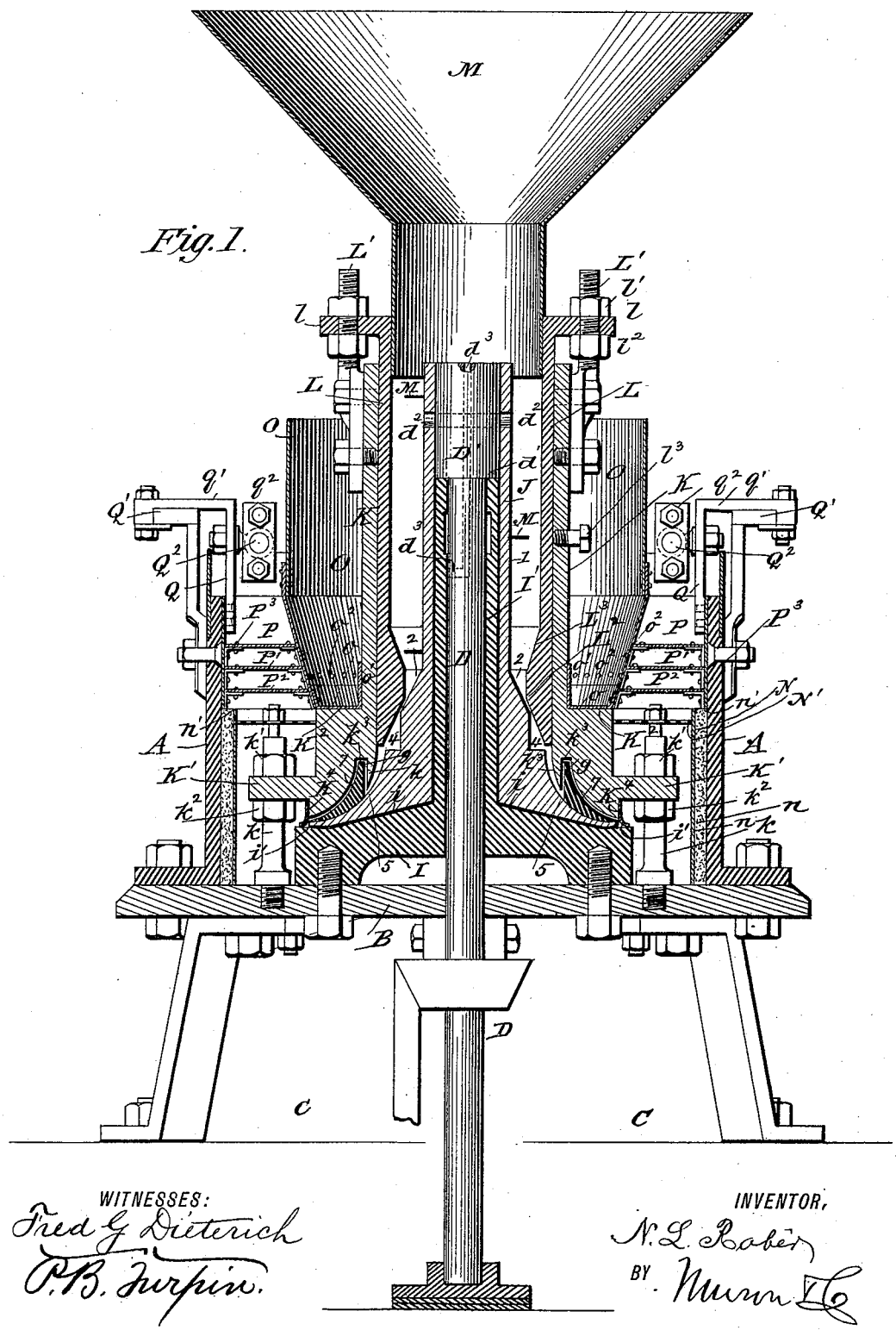
Figure 6:
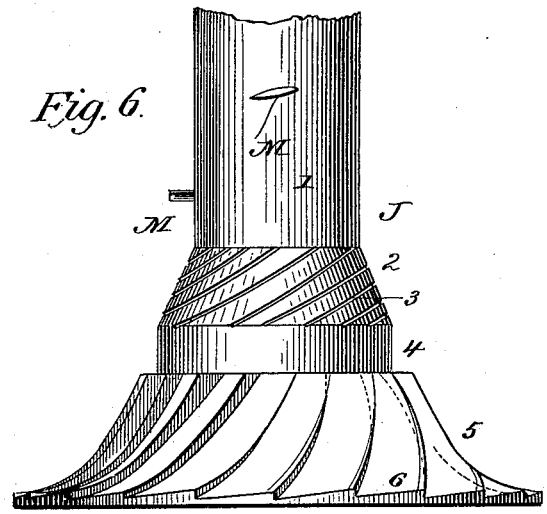
Figure 7:
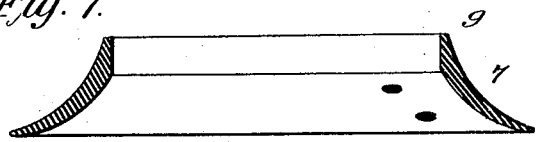
Figure 8:
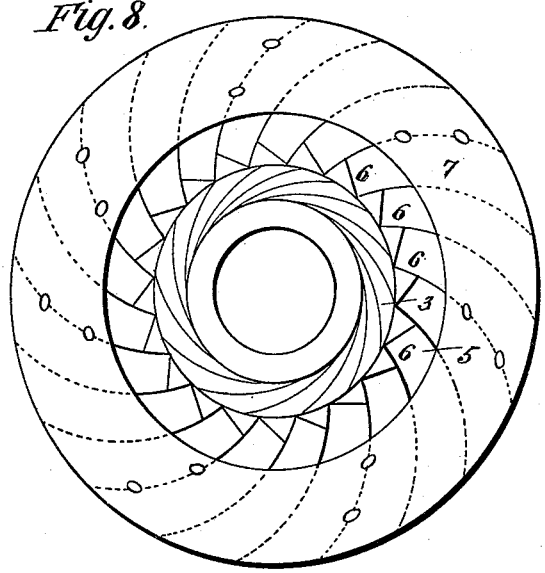

In the drawings, Figure 1 is a vertical section of the machine. Fig. 2 is a plan view thereof. Fig. 3 is a detail view of the separator, parts being broken away and others shown in section. Fig. 4 is a side elevation of the machine and its drive mechanism. Fig. 5 is a detail view illustrating the feed-regulator. Fig. 6 is a detail side view of the feed-wheel, the cover part thereof being removed. Fig. 7 is a sectional view of the cover-plate of the feed-wheel. Fig. 8 is a detail plan view of the feed-wheel with its cover-plate in place. Fig. 9 is a detail vertical sectional view of the disintegrating feed-wheel, having one half shown in side view and the other half shown in section; and Fig. 10 shows the eccentrics in detail.

In the construction shown the drum A is mounted on base-plate B, which has legs supporting it above a suitable frame, C, in which frame is provided the step for the vertical shaft D and bearings for the horizontal shaft E, which shafts D E are geared together by bevel-wheels F $f$, as shown. I wish it distinctly understood, however, that I do not confine myself to the mechanism shown for driving the shaft of the amalgamator, as such shaft may be driven in various other ways, or, if desired, in a small machine by hand, without involving any departure from some of the broad features of my invention. The framing C also supports bearings for a counter-shaft, G, driven from shaft E, and having eccentrics $g$ $g$ fitting eccentric-straps $h$ on rods H, such eccentrics $g$ $g$ being projected in opposite directions, so they will operate their rods H reciprocally, for the purposes hereinafter explained.

Centrally on the base-plate I secure—it may be by screws, as shown—a pedestal, I, having its upper surface beveled at $i$ downward and outward to a point near its outer edge, whence it inclines up slightly at $i'$ to such edge. This pedestal is provided with a central upwardly-projected portion, I', the pedestal being bored axially and an opening being formed through the base-plate for the passage of the vertical shaft D. At its upper end, where it projects above the portion I' of pedestal I, the shaft D is enlarged at D' to a diameter slightly larger than that of the upper end of part I', forming a shoulder at $d'$ and fitting snugly in the upper end of disintegrating feed-wheel J, to which it is secured by pin $d^2$, or in other suitable manner, so the shaft D will operate to turn the feed-wheel, the enlarged portion D' being made sufficiently long to insure the rigidity of the feed-wheel. An oil-hole, $d^3$, is formed in the shaft D, leading downward from its upper end, as indicated in the dotted lines, Fig. 1. The disintegrating feed-wheel J, which forms the feeder for the sand, pulp, &c., is adjusted to run over and conform closely to the tubular part I' and the broad top of the pedestal, and yet to clear these surfaces, and the weight of feed-wheel is carried, and this clearance adjusted by means of step-box, Fig. 4, upon which it rests by its vertical shaft. This step-box is raised or lowered by packing-plates or other suitable adjusting devices. The base of the feed-wheel also extends at its outer edge approximately to the upwardly-extended portion $i'$ of the top of the pedestal, the feed-wheel thus terminating a short distance in from the outer edge of the pedestal.

I make the feed-wheel with the upper cylindrical part, 1, the tapered part 2 below part 1, and formed, preferably, with spiral grooves 3, the short cylindrical part 4, and the outwardly-flared fluted part 5, the part 5 having flutes 6 and having the outer ends of such flutes covered by rim-cover 7, forming consequently passages opening out of the outer edge or rim of the feed-wheel. In the construction shown the body of the feed-wheel and its rim-cover plate 7 are made separate and the cover secured on the body by bolts or rivets 8, and it will be understood that such construction may, on account of greater convenience in casting the parts, be preferred; but I do not desire to be limited to such construction, as obviously the wheel-body and cover complete might be formed in a single piece without departing from the broad principle of this feature of my invention.

The cover-tube K is fitted over the feed-wheel, and is supported so it can be adjusted vertically, being preferably supported on stud-bolts $k$, mounted on the base-plate, and passing up through flange K′ of the cover, and having nuts $k'$ $k^2$ above and below said flange, so the cover may be adjusted up or down and held in its different adjustments. Above the flange K′ the cover also has a shoulder, $K^2$, at the upper end of the thickened portion, which is formed to reduce the size of the mercury-space. At its lower end the cover extends at its outer edge to a point above and preferably slightly in from the outer edge of the feed-wheel, the lower end of the cover-tube being of less diameter than the base of the pedestal. The cover-tube fits over the fluted part of the feed-wheel, and has an annular groove, $K^3$, which receives the upper edge or extension, 9, of the rim-cover plate, the portion $k^3$, forming the inner wall of such groove, serving as a guard to prevent pulp, sand, and the like from passing over the rim-cover, and directing such particles through the passages formed between the flutes of and opening out of the rim of the feed-wheel.

A discharge space or opening is provided between the outer edges of the cover-tube and the pedestal, through which the disintegrated mass may be thrown into the mercury-space, such opening being guarded by a check-valve, $K^4$, formed, preferably, of a band or ring of rubber having a portion encircling and gripping the lower end of the cover-tube, and a portion extending below such tube and bearing against the pedestal, thus preventing the immediate contact of the revolving feed-wheel and the mercury, and so avoiding the flouring of the latter, while at the same time the material may pass from the feed-wheel into the mercury, as desired.

Within the cover-tube I arrange the feed-regulator L, fitting over the feed-wheel and adjustable vertically, so it may be set to vary or regulate the feed as desired. To effect this adjustment, I extend the regulator-tube above the cover-tube and provide the former with lateral lugs or portions $l$, having openings fitting bolts or studs L′, projected from and above the cover-tube, and provided with nuts $l'$ $l^2$, bearing above and below portion $l$ of the regulator, so the latter can be adjusted up or down and held in its different adjustments. A set-screw, $l^3$, also serves to tighten the regulator-tube in its different adjustments, the said screw being turned through the cover-tube and bearing at its inner end against the regulator-tube.

Near its lower end the regulator-tube has an interior beveled face, $L^2$, corresponding to and coacting with face 2 of the feed-wheel. Above the face $L^2$ the regulator has a beveled face, $L^3$, forming, practically, a guide-funnel to direct the pulp, &c., to the faces $L^2$ 2. I also provide on the portion 1 of the feed-wheel short projecting ribs M, inclined to the horizontal, thus serving in a measure as threads or spirals to force the pulp downward to the disintegrating-faces, and also operating to partially break up the mass fed into the machine. By preference the parts M are held to the part 1 by forming them with screw-tenons $m$, fitting sockets in the feed-wheel. A hopper, M′, leading into the upper end of the feed-regulator, serves to facilitate the feeding of material into the machine.

Within the drum I support a lining plate or cylinder, N, made, preferably, of a silver-plated copper plate and smaller than the internal diameter of the drum, providing a space between such drum and lining-plate, which is usually filled with plaster-of-paris, $n$. This forms an upwardly-facing shoulder or offset, $n'$, within the drum at the top of the plate N, in order to prevent the sand, pulp, &c., from passing up outside of the outer rim-plate of the separator, hereinafter described.

The plate N forms the outer wall of the mercury-space, and such space is divided by a horizontal perforated partition-plate, N′, which serves to break up and destroy any motions, currents, or the like imparted to the lower portion of the mercury. This partition-plate N′ is supported on the bolts which support the cover-tube, before described.

The reservoir O consists of a cylindrical vessel having the upper portion made of sheet-iron and the lower tapered portion made of silver-plated sheet-copper. This reservoir conforms at its bottom $o$ to but oscillates clear of the shoulder $K^2$ of the cover-tube, having its said bottom just above such shoulder $K^2$, and being provided with an inner flange or plate, $o'$, which encircles the cylindrical portion of cover-tube I. This reservoir holds the water by which the sand, pulp, &c., are raised off the surface of the mercury in the drum, and is carried off through the discharge. To do this, water passes through perforations $o^2$ in the side and near the bottom of the reservoir, as shown in Figs. 1 and 3.

The separator comprises a plurality of perforated annular silver-plated copper plates, P P′ P², usually three in number, arranged parallel to each other and in different horizontal planes, a space being left between them, as most clearly shown in Figs. 1 and 3. These plates are secured at their inner ends by riveting, or in other suitable manner, to the reservoir, near the bottom of the said reservoir, and at their outer edges to a ring, $P^3$, which fits closely the interior of the top of the drum and extends at its lower edge down close to but clear of the offset $n'$ in the drum.

In case much water is to be fed into the machine together with the sand, pulp, &c., I make the perforations $o^2$ just above the lower plate of the separator; but if the material is to be fed dry, or nearly so, the perforations should be below the lower separator-plate and immediately above the surface of the mercury.

The separator and the reservoir are suitably supported in the construction shown on guide-rails, so that they can be given an oscillatory motion. While I prefer the particular construction hereinafter described for giving the oscillating motion to the separator, it will be understood that I do not desire to be limited in the broad features of my invention thereto.

To the outer ring-plate of the separator I connect hangers Q, which extend upward above the drum and outward at $q'$ bearing on rails or guides $Q'$, mounted preferably on the drum and having portions lapping against and under the outer edge of the said rails, as shown in Fig. 1. These guide-brackets are vertically adjustable, so as to raise or lower the separator and reservoir.

The rods H are connected with the hangers Q, preferably by means of balls $Q^2$ on the hangers and socket-pieces $q^2$ on the rods, as shown, and the separator is thus automatically oscillated as the machine is operated, the said rods H being moved reciprocally by the relative arrangement of their eccentrics, as before described. The separator being oscillated at the time the sand and pulp are being forced through it by hydrostatic pressure from the reservoir, the pulp is freed from all globules or particles of mercury or amalgam, as it will be understood that these plates being charged with mercury readily take up globules of mercury or amalgam that may be in said sand, pulp, &c., until these globules, by their increased weight and the oscillating of the separator, fall back into the mercury-space within the drum.

In practice the sand, pulp, &c., are fed into the hopper in such quantities as to keep the hopper and annular space between the feed-regulator tube and the feed-wheel full of material, thus precluding air from passing in any considerable quantity into the mercury, as the air by so passing through would oxidize the mercury and cause its loss. From the hopper the material is kept moving by its gravity and by the inclined lugs or blades on the feed-wheel downward until it is caught by the flutes of the feed-wheel. Between faces $L^2$ and 2 the passage for the sand and pulp is restricted, and here the amount of feed is determined by increasing or reducing the size of the passage. When the sand, pulp, &c., have passed the feed-regulator, they are caught and thoroughly disintegrated by the flutes of the lowered tapered portion of the feed-wheel, and passing in this fine state of disintegration down through the passages of the wheel to its periphery they are then thrown grain by grain into the bottom of the body of mercury in the mercury-space. There the mercury seizes the fine gold, which it cannot fail to do, owing to the almost perfect mechanical separation of the sand, pulp, &c., and their contact with the mercury, and the amalgam thus formed settles to the bottom of the mercury-space; but silver and other metals that are lighter than mercury will readily amalgamate and remain in the mercury.

The drum may be filled with mercury to any desired height, but ordinarily from three to twenty-four inches will be sufficient. The sand, pulp, &c., rise through the mercury to the surface, where they are carried through the separator-plates, thereby losing any mercury that may be in them, and by the flow of water from the reservoir they pass with such water out of the discharge. By the arrangement of my water-reservoir centrally within the separator the water is directed or discharged adjacent to said separator and passes outward. The oscillation of the separator aids in causing currents in the water, producing agitation of the pulp, sand, &c., preventing any massing of the latter, and causing them to pass up better through the separator, and insuring a better contact of the particles of precious metals with the plates of such separator.

Having thus described my invention, what I claim as new is—

1. In an amalgamator, the combination of the base, the drum, the pedestal having its upper face inclined downward from its center outward and provided near its outer edge with an upwardly-inclined portion, the feed-wheel fitted over said pedestal down close to the upper face thereof, and provided with passages for the pulp, &c., such passages having their open outer ends arranged adjacent to the upwardly-inclined portion of the pedestal, and the cover-tube, all substantially as and for the purposes specified.

2. In an amalgamator, a disintegrating feed-wheel formed with flutes and having the outer ends or portions of said flutes covered with a ring-like cover-plate, which is attached to and revolves with the wheel, forming closed passage-ways opening out of the rim of said wheel, said cover-plate having an edge or extension, 9, just above said passage-ways, whereby to guide the pulp, &c., thereinto, substantially as set forth.

3. The combination of the feed-wheel having a beveled circular face, 2, the cover-tube, the regulator-tube fitted within said cover-tube and over the feed-wheel, and having a beveled circular face, $L^2$, corresponding to and concentric with face 2 of the feed-wheel, said regulator-tube having lateral arms engaging studs on the cover-tube, and nuts on said studs, whereby the regulator-tube may be adapted to set the faces L² and 2 together or apart, substantially as set forth.

4. The combination, in an amalgamator, with the feed-wheel and the cover-tube, of the regulator-tube fitted over the feed-wheel in the cover-tube, and adjustable supports for said regulator-tube independent of the cover-tube, whereby the regulator may be adjusted independently of the cover-tube, substantially as set forth.

5. In an amalgamator, the combination of the cover-tube, the feed-wheel, the regulator-tube fitted over the feed-wheel and having lateral arms at its upper end, studs or standards mounted on the cover-tube and passing through openings in the lateral arms of the regulator-tube, and nuts on said studs above and below such arms, substantially as set forth.

6. The improvement in amalgamators, comprising the disintegrating feed-wheel having a face, 2, the cover-tube and the regulator-tube fitted over the feed-wheel and having a beveled face, L², corresponding to the face 2 of the feed-wheel, such regulator-tube being also provided above the face L² with a beveled or inclined face, L³, inclined approximately in a reverse direction to such face L², substantially as and for the purposes specified.

7. In an amalgamator, the combination of the base, the drum, the pedestal having its upper face provided near its outer edge with an upwardly-inclined portion, the feed-wheel fitted over said pedestal and having passages formed through it and opening out of its rim, the cover-tube, the adjustable regulator-tube, and the annular check-valve, substantially as set forth.

8. In an amalgamator, the combination of the pedestal, the feed-wheel, the cover-tube having its lower outer edge arranged in a plane above the outer edge of the pedestal, forming a passage-way between said cover-tube and pedestal, and the annular check-valve supported above the said passage-way and extended down over the same and bearing on the pedestal, substantially as and for the purposes specified.

9. In an amalgamator, the combination of the pedestal, the feed-wheel, the cover-tube arranged over and concentric with the pedestal and having its lower end formed of less diameter than the pedestal-base, and the annular check-valve supported on the cover above the pedestal and bearing at its lower end on said pedestal, substantially as set forth.

10. In an amalgamator, the combination of the feed-wheel having closed passage-ways opening out of its rim and provided at the inner end of and just above said passage-ways with an edge or extension, 9, whereby to guide the pulp, &c., thereinto, and the cover-tube having an annular groove receiving such extension 9, substantially as set forth.

11. In an amalgamator, the combination of the drum having a mercury-space and provided with an internal upwardly-facing shoulder or offset, and a separator arranged above said shoulder or offset and having its outer plate or edge extended down close to said offset, the mercury-space being provided below the offset of the drum, substantially as and for the purposes specified.

12. The combination of the base and the drum, having an offset, $n$, with the pedestal and the cover-tube having an offset, $K^2$, forming an annular mercury-space between them whose height is exactly the height of said offsets, with an annular separator and water-reservoir arranged just above but quite clear of said mercury-space, the outer ring of the separator being just above offset $n'$ and the water-reservoir being just above offset $K^2$, said separator consisting, essentially, of a number of perforated annular silver-plated copper plates arranged in different horizontal planes connected together and suitably supported, substantially as set forth.

13. In an amalgamator, the combination of the drum having the mercury-space, the guides or rails rigidly supported at the upper end of said drum, the separator arranged in the drum above the mercury-space and close to the inner wall or surface of said drum, and the hangers connected with said separator and extended to and having portions engaging and sliding on the guides or rails, whereby to support the separator, so it may be oscillated, substantially as set forth.

14. The combination of the drum, the guides or rails, the separator having hangers arranged to engage said rails, the balls on said hangers, the connecting-rod having at one end ball-sockets receiving said balls and having eccentric-straps at their opposite ends, and the shaft having eccentric-disks fitting within said straps, substantially as set forth.

15. In an amalgamator, the combination, with the drum and the cover-tube and feeder therein, of the annular water-reservoir encircling the cover-tube and made of an external diameter considerably less than the internal diameter of the drum, and adapted for use, substantially as set forth, whereby the water, pulp, &c., may pass upward between the water-reservoir and drum and be discharged at the top of the latter, as and for the purposes specified.

16. The combination, in an amalgamator, of the drum, the cover-tube having an upwardly-facing shoulder, the reservoir arranged above said shoulder, and the feeder arranged in said cover-tube, substantially as set forth.

17. In an amalgamator, the combination of the drum, the feeder and cover-tube concentrically within the drum, the annular water-reservoir encircling the cover-tube, and the separator connected at its inner edge with the water-reservoir and extending to and fitted at its outer edge snugly against the inner surface of the drum, such separator and reservoir being suitably connected, whereby they may be oscillated, substantially as set forth.

18. In an amalgamator, the combination of the drum having an internal upwardly-facing shoulder, the cover-tube arranged concentrically in said drum and having an external upwardly-facing shoulder, the separator having its outer edge or plate arranged over the shoulder of the drum, and the reservoir connected with the separator and arranged above the shoulder of the cover-tube, substantially as set forth.

19. In an amalgamator, the drum having an inner concentric lining-plate of less external diameter than the internal diameter of the body of the drum, and a filling between said lining-plate and drum-body, said lining-plate being shorter than the drum-body, providing an internal upwardly-facing shoulder, substantially as set forth.

20. The combination of the base, the drum, the pedestal mounted on the base centrally within the drum, the feed-wheel over said pedestal, the cover-tube fitted over said feed-wheel, the adjustable regulator-tube within said cover-tube, the annular separator, and the annular water-reservoir within the drum and encircling the cover-tube, all substantially as and for the purposes specified.

21. In an amalgamator, the combination of the drum, the revolving feed-wheel, the pedestal centrally within the drum, the cover fitted over the feed-wheel, the check-valve, the perforated partition-plate N', located within the mercury-space of the drum, the separator, and the reservoir encircling the cover, substantially as and for the purposes specified.

22. In an amalgamator, a feed-wheel having its lower flared portion formed on its upper side with flutes leading to its outer edge and provided with a ring-like cover-plate secured to and revolving with the said wheel and arranged over the outer ends of said flutes, forming closed passage-ways between the said flutes at their outer ends, substantially as set forth.

23. An amalgamator comprising a drum or casing having a mercury-space, a feeder arranged to discharge the pulp, &c., into said mercury-space, and a separator and a water-reservoir arranged within said drum and above the mercury-space, such reservoir and separator being connected, substantially as set forth.

NATHAN LEROY RABER.

Witnesses:
   A. O. ECKELSON,
   J. R. BRYSON.